UNITED STATES PATENT OFFICE.

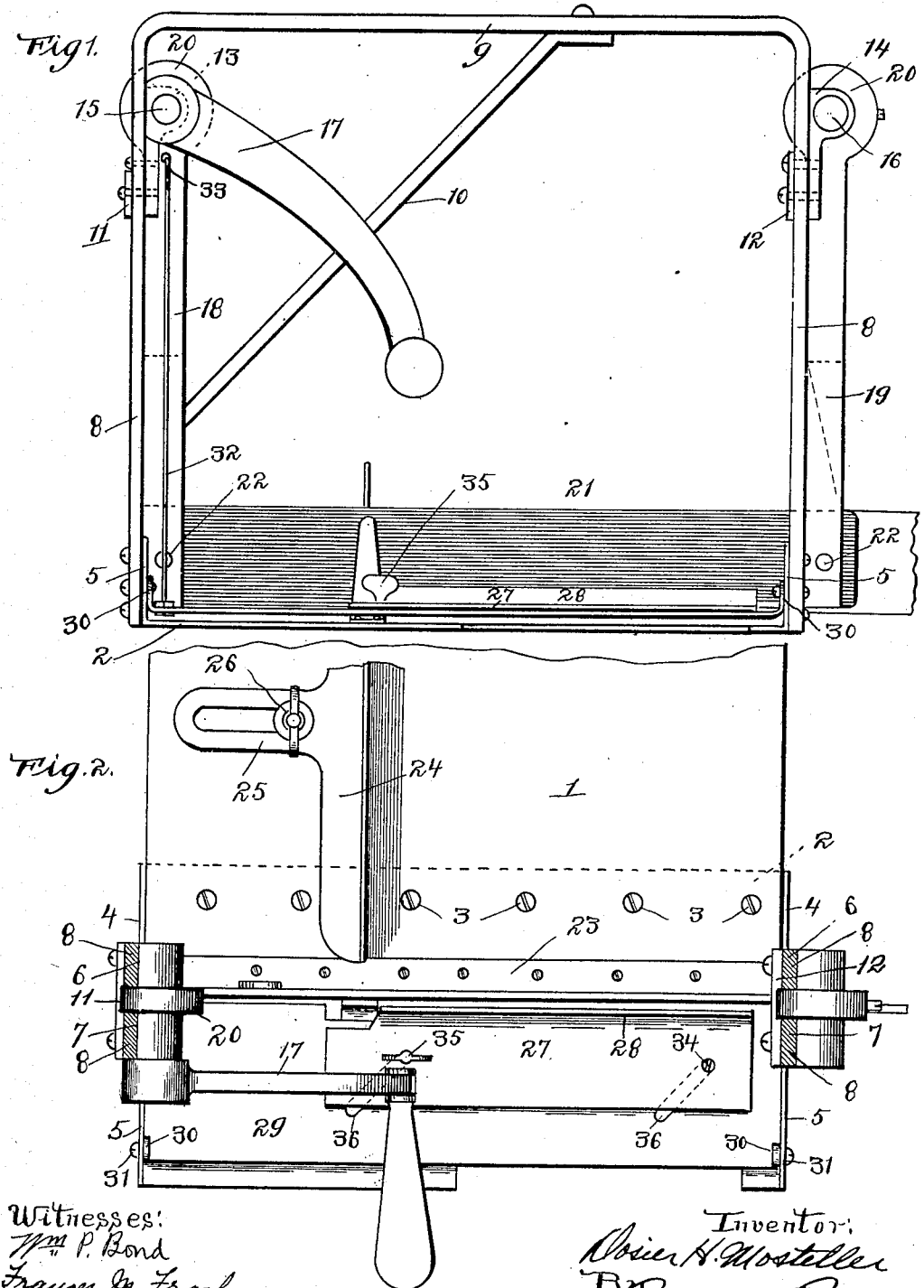

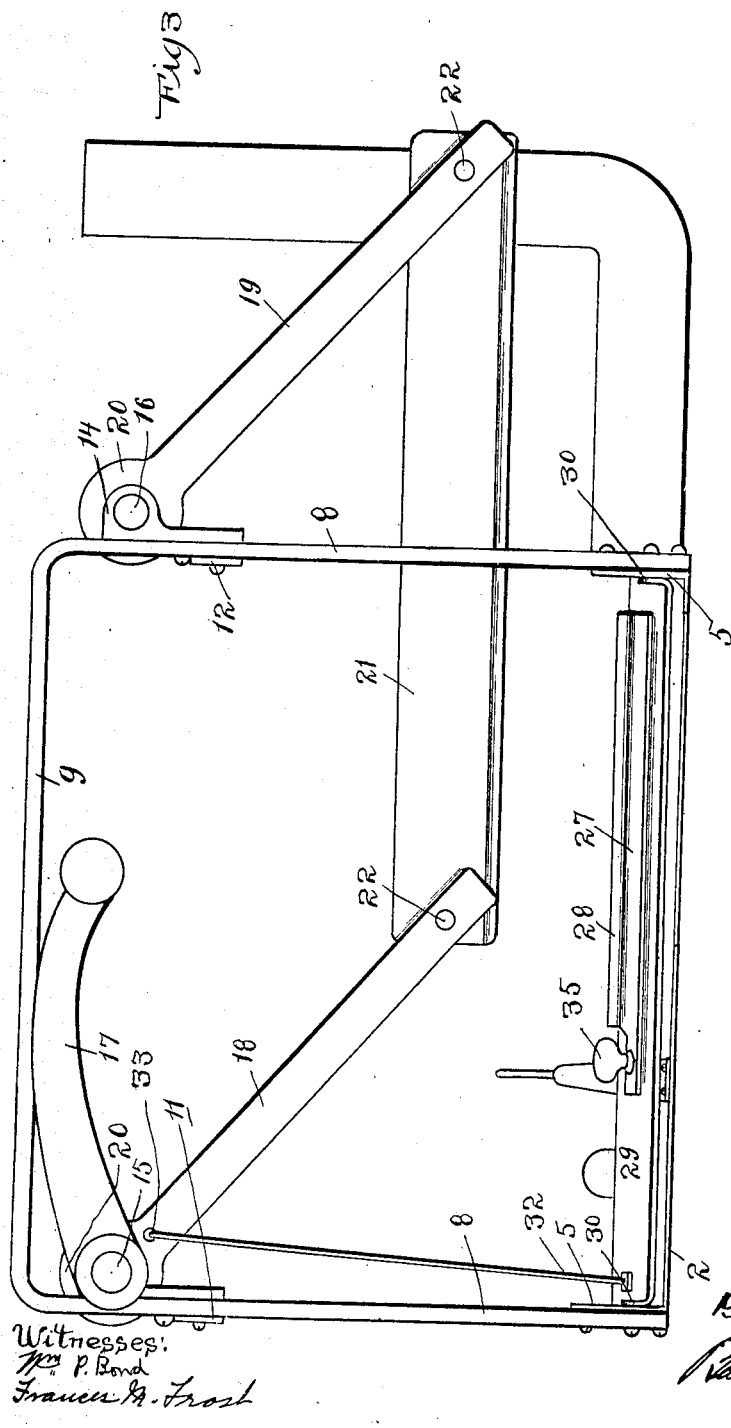

DOSIER H. MOSTELLER, OF CHICAGO, ILLINOIS, ASSIGNOR TO THE MOSTELLER MANUFACTURING COMPANY, OF CHICAGO, ILLINOIS, A CORPORATION OF ILLINOIS.

BREAD AND MEAT SLICER.

No. 885,274.　　　　Specification of Letters Patent.　　　Patented April 21, 1908.

Application filed February 5, 1906.　Serial No. 299,541.

*To all whom it may concern:*

Be it known that I, DOSIER H. MOSTELLER, a citizen of the United States, residing at Chicago, in the county of Cook and State of Illinois, have invented certain new and useful Improvements in Bread and Meat Slicers, of which the following is a specification.

This invention is intended for household or hotel use in slicing bread, bacon, meat or similar articles of food, and has for its object to provide a knife adapted to cut off slices of uniform thickness without tearing or breaking the slices or wasting the bread or meat.

The further object of the invention is to provide means for regulating the thickness of the slices, and adjustable means for adapting the machine for use with loaves or pieces of meat of different shapes and sizes, thereby adapting the slicer for general household or hotel use.

Another object of the invention is to provide means for automatically discharging the severed slices.

The operation of the cutting blade is one which gives a slicing movement adapted to smoothly and evenly sever the slice of bread or meat without causing any loss from crumbs or broken particles, and enabling the bread or meat to be delivered in satisfactory style to the consumer.

The invention consists in the features of construction and combination of parts hereinafter described and claimed.

In the drawings Figure 1 is a side elevation of the slicer with the knife lowered; Fig. 2 a top or plan view; and Fig. 3 a side elevation showing the knife raised.

The slicing mechanism is mounted on a board or table 1, preferably of wood, to the lower face of one end of which is secured a plate 2 which is attached by means of screws 3, or in any other suitable manner, and is provided with upturned flanges 4—4 and 5—5, the former of which embrace the side edges of the board and extend upwardly therefrom and form supports for the attachment of the operating mechanism. To the upturned flanges 4—4 and 5—5 are attached two separated supporting yokes 6 and 7 each of which consists of two uprights 8—8 at opposite sides of the cutter, connected by means of a cross rail 9 which is raised a considerable distance above the table, and the yokes provide a framework or support for suspending the cutting knife. The top rail of the inner yoke 6 is reinforced by means of a diagonal brace 10 which unites the framework into a rigid structure capable of withstanding long and continued usage. The separated side uprights 8 are connected by means of cross bars 11 and 12 the former of which is on the outside and the latter on the inside of the framework. Near the top of the framework are two pairs of journal boxes 13 and 14 positioned at equal vertical elevation, the journal boxes 13 being secured to the side supports or uprights on the inside thereof, and the journal boxes 14 being secured to the opposite uprights on the outside thereof. The two pairs of journal boxes serve as mountings for journal pivots 15 and 16, the former of which is extended sufficiently to provide for the attachment of an operating handle 17 thereto. Between the companion journal boxes of each pair are mounted depending swinging arms 18 and 19 each having enlarged heads 20 which are rigidly mounted on the journal pivots 15 and 16 respectively the handle being rigidly secured so that the movement of the handle swings the arm 18. The free ends of the arms 18 and 19 are pivoted to the ends of a slicing knife 21 by means of pivots 22 properly spaced to maintain the swinging arms in parallel relation at all times. The knife is adapted to swing between one pair of uprights, 8 so that as the handle is moved the knife will be raised from the position shown in Fig. 1 to the position shown in Fig. 3.

The knife coöperates with a fixed bar 23 secured to the end of the board 1 in suitable position to have the knife edge swing into close proximity to the bar to cut off the bread held beneath the knife. The bread is positioned for cutting by means of a guide 24 having a slotted arm 25, through which extends a thumb screw 26 for allowing the guide to be shifted in any suitable position to accommodate the slicer to loaves of different sizes and shapes. The thickness of each slice is determined by means of an adjustable plate 27 having a flange 28 on its inner edge, and the plate 27 is adjustably mounted upon a tilting plate 29 provided near its outer corners with upturned ears 30 which are pivoted to the supporting flanges 5 by means of pivots 31, and movement is given to the tilting plate 29 by means of a rod 32 which is provided at its upper end with a hook 33 which is entered into the arms 18 near its pivotal center, thereby giving a slight movement to the tilting plate with each swing of the arm. The position of the guide plate 27, which serves as a stop or abutment, can be shifted upon the tilting plate by means of a guide pin 34 and a thumb screw 35, both of which enter diagonally extending slots in the tilting plate, allowing the flanged plate or stop to be moved into greater or less proximity to the cutting knife in order to determine the thickness of the slice to be severed with each operation.

In use the knife 21 is shifted into proper position to accommodate the particular loaf of bread or meat desired to be sliced, and is held in adjusted position by screwing down the thumb screw for which the knife is thrown up into position shown in Fig. 3 by the movement of the operating handle, and the stop or guide plate 27 is adjusted to the proper point to cut slices of the required thickness; and as the loaf after being suitably positioned on the table 1 by means of the guide 24 is brought into contact with the abutment, the operating handle is moved to draw down the knife from the position shown in Fig. 3 into the position shown in Fig. 1. The swinging arms being held in parallel relation at all times, the knife edge will be drawn back at the same time that it is lowered, so that a slicing movement will result, which is very much more effective and satisfactory than an ordinary straight line movement. In fact, it will be impossible to satisfactorily cut soft bread without giving to the knife a slicing movement, since otherwise the bread will be crushed and not cut off. The knife edge finally descends below the edge of the stationary bar 23, so that a complete severance of the slice is effected. When the knife is in the raised position shown in Fig. 3 the inner edge of the tilting plate will be raised substantially flush with the upper edge of the fixed plate 23, and the supporting flange 28 on the adjustable stop plate 27 will be raised above the edge of the fixed plate 23, which provides a perfect abutment for the contact of the bread. As the knife descends the tilting plate will descend into level position, as shown in Fig. 1, in which position the top of the stop flange will be drawn down below the top edge of the plate 23, so that when the slice of bread is finally severed, the stop flange will not interfere with the drop of the slice onto the plate 27. The severed slice will be automatically removed by reason of the action of the tilting plate so that the next operation of the slicer will be unimpeded, and consequently a loaf may be cut in one continuous operation with the greatest facility and ease, and this without the necessity for stopping to clear away the slices already severed. This leaves the hands of the operator entirely free for the purpose of operating the handle and feeding forward the loaf to be cut, which can be cut into perfect slices of uniform thickness with great rapidity and without any appreciable waste due to crumbs or pieces of bread broken through the cutting operation.

The guide 24 can be adjusted to any suitable angle, so that bread or meat can be diagonally sliced if so desired, and the slicer, when it becomes dull, can be readily removed from the swinging arms and sharpened or another blade substituted without any difficulty or trouble.

The device is so constructed that it is strong and rigid and adapted to be operated without any transverse vibration of movement of the knife which is closely held between the upright supports which compel its movement in the proper direction.

What I claim as new and desire to secure by Letters Patent is:

1. In a slicer of the class described, the combination of a knife, a tilting plate hinged to one side of the plane of movement of the knife, a stop on the tilting plate for limiting the projection under the knife of the material to be cut, means for actuating the knife, and a connection between the tilting plate and the actuating means for lowering the tilting plate simultaneously with the descent of the knife, substantially as described.

2. In a slicer of the class described, the combination of a knife, means for pivoting the knife in position to give a shearing action, means for actuating the knife, a board or table adjacent to the edge of the knife when lowered, a tilting plate hinged adjacent to the plane of movement of the knife on the side opposite the board, a stop on the tilting plate, and a connection between the knife actuating means and the tilting plate, for lowering the latter simultaneously with the descent of the former, substantially as described.

3. In a slicer of the class described, the combination of supporting yokes, depending arms journaled to the yokes, a knife pivoted to the free ends of the arms and adapted to swing between the yokes, a handle connected with one of the arms, a board or table adjacent to the knife when lowered, a tilting plate journaled adjacent to the plane of movement of the knife on the side opposite the table, a stop on the tilting plate, and a rod connecting the tilting plate with one of the knife actuating arms for lowering the tilting plate and stop simultaneously with the descent of the knife, substantially as described.

DOSIER H. MOSTELLER.

Witnesses:
 WALKER BANNING,
 OSCAR W. BOND.